(12) United States Patent
Aoshima

(10) Patent No.: US 6,308,087 B1
(45) Date of Patent: Oct. 23, 2001

(54) RADIO SELECTIVE CALLING RECEIVER AND MESSAGE RECEIVING METHOD

(75) Inventor: Takashi Aoshima, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/255,532

(22) Filed: Feb. 22, 1999

(30) Foreign Application Priority Data

Feb. 26, 1998 (JP) .................................................. 10-045478

(51) Int. Cl.[7] ...................................................... H04D 7/20
(52) U.S. Cl. .................. 455/575; 379/88.05; 379/88.06; 340/825.44
(58) Field of Search ..................... 455/31.2, 31.3, 455/38.1, 414, 418, 556, 563–550, 466, 575; 379/210, 201, 207, 88.06; 704/2, 3, 5, 8, 6, 270, 10, 234, 224, 260; 340/825.44, 825.47, 311.1

(56) References Cited

U.S. PATENT DOCUMENTS

| 5,635,918 | * | 6/1997 | Tett ................................. 340/825.52 |
| 5,701,497 | * | 12/1997 | Yamauchi et al. ........................ 704/3 |
| 5,884,248 | * | 3/1999 | Hall ........................................ 704/8 |
| 5,889,473 | * | 3/1999 | Wicks ............................. 340/825.44 |
| 5,946,376 | * | 8/1999 | Cistulli ............................. 379/88.06 |
| 5,966,685 | * | 10/1999 | Flanagan et al. ......................... 704/8 |
| 5,987,401 | * | 11/1999 | Trudeau .................................... 704/2 |
| 6,047,196 | * | 4/2000 | Makela et al. ....................... 455/556 |
| 6,076,121 | * | 6/2000 | Levine .................................. 710/62 |
| 6,085,112 | * | 7/2000 | Kleinschmidt et al. ............. 455/556 |
| 6,161,082 | * | 12/2000 | Goldberg et al. ........................ 704/3 |
| 6,233,317 | * | 5/2001 | Homan et al. .................... 379/88.06 |

FOREIGN PATENT DOCUMENTS

A-5-35776   2/1993 (JP) .

* cited by examiner

Primary Examiner—Tracy Legree
Assistant Examiner—Jean A Gelin
(74) Attorney, Agent, or Firm—Scully, Scott, Muphy & Presser

(57) ABSTRACT

Disclosed is a message receiving method executed on a radio selective calling receiver, which comprises: a first step of judging whether a received message is originated from a local transmission station or a non-local transmission station; a second step of judging whether the received message is an information message or a personal message when the received message is judged to be originated from the non-local transmission station; a third step of judging whether or not a native language is used in the received message when the received message is judged to be the information message; a fourth step of translating the received message into a native language when it is judged that the native language is not used in the received message.

19 Claims, 4 Drawing Sheets

| LANGUAGE | COUNTRY | AREA |
|---|---|---|
| ENGLISH | UNITED KINGDOM | ALL AREAS |
|  | USA | ALL AREAS |
|  | CANADA | ENGLISH SPOKEN AREAS |
| FRENCH | FRANCE | ALL AREAS |
|  | CANADA | FRENCH SPOKEN AREAS |
| GERMAN | GERMANY | ALL AREAS |

RADIO SELECTIVE CALLING RECEIVER AND MESSAGE RECEIVING METHOD

BACKGROUND OF THE INVENTION

1. Field of the Invention

The present invention relates to a radio selective calling receiver which is also referred to as a pager, and in particular, to a radio selective calling receiver having a multilingual function. The present invention also relates to a message receiving method for a radio selective calling receiver.

2. Description of the Prior Art

In a radio calling system in which a radio selective calling receiver receives a self-addressed message transmitted from its local (or subscription) transmission station through a non-local (or non-subscription) transmission station and, for example, the local transmission station and the non-local transmission station are located in different countries and their service areas do not overlap, even when a user of a radio selective calling receiver who subscribes to the local transmission station travels a service area of the non-local transmission station, the receiver can receive the information message transmitted from the local transmission station through the non-local transmission station because system information such as area code, country code, and transmission station code is included in wireless calling information.

However, even when the radio selective calling receiver receives an information message such as weathercast information, traffic information, or sightseeing guide information from the non-local transmission station located in a different country, the user of the radio selective calling receiver cannot usually understand the information because the information is usually expressed in the language of the non-local transmission station (hereinafter referred to as non-native language) rather than the language of the local transmission station (hereinafter referred to as native language).

Thus, there is desired a radio selective calling receiver which enables a user to recognize in his/her native language an information message transmitted from the non-local transmission station in a different country or an area where he/she travels.

In order to satisfy such needs, a portable translating apparatus having an automatic language-selecting function is disclosed in JPA-5-35776 by Hirayama. In this prior art reference, when an information message in a non-native language is received from a transmission facility located in each area, the language in each area is identified corresponding to the information message. The language is selected from a plurality of languages stored in the unit. A prescribed language is translated into the selected language.

In the translating apparatus having an automatic language-selecting function, a frequency band of a stereo audio signal obtained by demodulating a received FM broadcast signal is scanned, whereby a data signal which represents a language and is multiplexed in a sub-carrier band in the stereo audio signal is extracted so as to identify the language. The relevant language is selected from a plurality of languages stored in a translated word data memory card. Thereafter, the user is prompted to speak his/her voice to be translated. His/her voice is collected by a microphone. The collected voice is subjected to voice-recognition to generate recognized data. Translated data signal corresponding to the recognized data is read from the translated word data memory card. The translated data is synthesized into a voice and the voice is output from a speaker. In addition, the translated data is output on a displaying portion.

The translating apparatus cannot translate a message in a non-native language into a user's desired native language.

Therefore, for example, a traveler who travels abroad cannot receive, in his/her native language, information transmitted in a non-native language from a non-local transmission station in the foreign country. The information includes weathercast information, traffic information, and sightseeing guide information as explained above.

In addition, although the data signal which represents a language and is multiplexed in a sub-carrier band of an audio stereo signal is extracted and the language is identified, once the translated word data memory card is switched to the language, all the received messages are automatically translated and a personal message transmitted from the local transmission station through the non-local transmission station in a different country is also translated into the language of the area of the country because the translating apparatus does not have an automatic determining function for determining whether or not to automatically translate a received message.

SUMMARY OF THE INVENTION

An object of the present invention is to provide a radio selective calling receiver having a multilingual function which can selectively do or do not translate a received message in accordance with the kind of the message and translate an information message into a native language of a user.

According to a first aspect of the present invention, there is provided a message receiving method, which comprises: a first step of judging whether a received message is originated from a local transmission station or a non-local transmission station; a second step of judging whether the received message is an information message or a personal message when the received message is judged to be originated from the non-local transmission station; a third step of judging whether or not a native language is used in the received message when the received message is judged to be the information message; and a fourth step of translating the received message into a native language when it is judged that the native language is not used in the received message.

The received message is not translated into the native language when the received message is originated from the local transmission station.

The received message is not translated into the native language when the received message is judged to be the personal message.

The received message is not translated into the native language when it is judged that the native language is used in the received message.

The first step may be executed by comparing an area code and country code in the received message with an area code and country code held by the receiver.

The first step may be executed by comparing a transmission station code in the received message with a transmission station code held by the receiver.

The second step may be executed by examining whether an address of the received message is allocated to the information message.

The examination may be carried out by referring to a memory which stores addresses allocated to the information messages.

The third step comprises steps of: extracting a pair of country code and an area code from the received message;

retrieving a language code corresponding to the pair of the country code and the area from a memory which stores correspondence between pairs of a country code and a area code and language codes; and comparing the retrieved language code with a native language code held in the receiver.

The third step may comprise steps of: extracting a transmission station code from the received message; and comparing the extracted transmission station code with a transmission station code held in the receiver.

According to a second aspect of the present invention, there is provided a radio selective calling receiver for receiving a message, which comprises: means for judging whether a received message is originated from a local transmission station or a non-local transmission station; means for judging whether the received message is an information message or a personal message when the received message is judged to be originated from the non-local transmission station; means for judging whether or not a native language is used in the received message when the received message is judged to be the information message; means for translating the received message into a native language when it is judged that the native language is not used in the received message.

According to a third aspect of the present invention, there is provided a radio selective calling receiver for receiving a message, which comprises: an antenna for receiving an encoded message; a synchronous signal detecting circuit for detecting a synchronous signal from the encoded message; a decoding circuit for decoding the encoded message into a message; a system information detecting circuit for detecting system information in the message; an address detecting circuit for detecting address in the message; a translating unit for executing translation of the message; a translated word data memory for storing translated data sets used for the translation; a home country/area code memory for storing a home country and home area of the receiver; a native language code memory for storing a native language code; an information message address memory for storing addresses of information messages; a language table memory for storing correspondence between languages and pairs of a country code and an area code; and controlling means for executing a first step of judging whether the received message is originated from a local transmission station or a non-local transmission station; a second step of judging whether the received message is an information message or a personal message when the received message is judged to be originated from the non-local transmission station; a third step of judging whether or not a native language is used in the received message when the received message is judged to be the information message; and a fourth step of causing the translating unit to translate the received message into a native language when it is judged that the native language is not used in the received message.

According to a fourth aspect of the present invention, there is provided a radio selective calling receiver for receiving a message, which comprises: an antenna for receiving an encoded message; a synchronous signal detecting circuit for detecting a synchronous signal from the encoded message; a decoding circuit for decoding the encoded message into a message; a system information detecting circuit for detecting system information in the message; an address detecting circuit for detecting address in the message; a translating unit for executing translation of the message; a translated word data memory for storing translated data sets used for the translation; a home transmission station code memory for storing a home transmission station code of the receiver; a native language code memory for storing a native language code; an information message address memory for storing addresses of information messages; a language table memory for storing correspondence between languages and transmission station codes; and controlling means for executing a first step of judging whether the received message is originated from a local transmission station or a non-local transmission station; a second step of judging whether the received message is an information message or a personal message when the received message is judged to be originated from the non-local transmission station; a third step of judging whether or not a native language is used in the received message when the received message is judged to be the information message; and a fourth step of causing the translating unit to translate the received message into a native language when it is judged that the native language is not used in the received message.

These and other objects, features and advantages of the present invention will become more apparent in light of the following detailed description of the best mode embodiment thereof, as illustrated in the accompanying drawings.

DESCRIPTION OF PREFERRED EMBODIMENTS

Next, with reference to the accompanying drawings, an embodiment of the present invention will be explained.

Messages which a radio selective calling receiver receives are categorized into information messages and personal messages. The information messages include, for example, weathercast information messages, traffic information messages, and sightseeing guide information messages as explained above. The personal information is a ordinary message transmitted from a person to another person. For a user of the radio selective calling receiver in the area under a non-local transmission station, an information message is transmitted in a non-native language while a personal message is transmitted in a language which is selected by a person who transmits the personal message.

Figure 1:
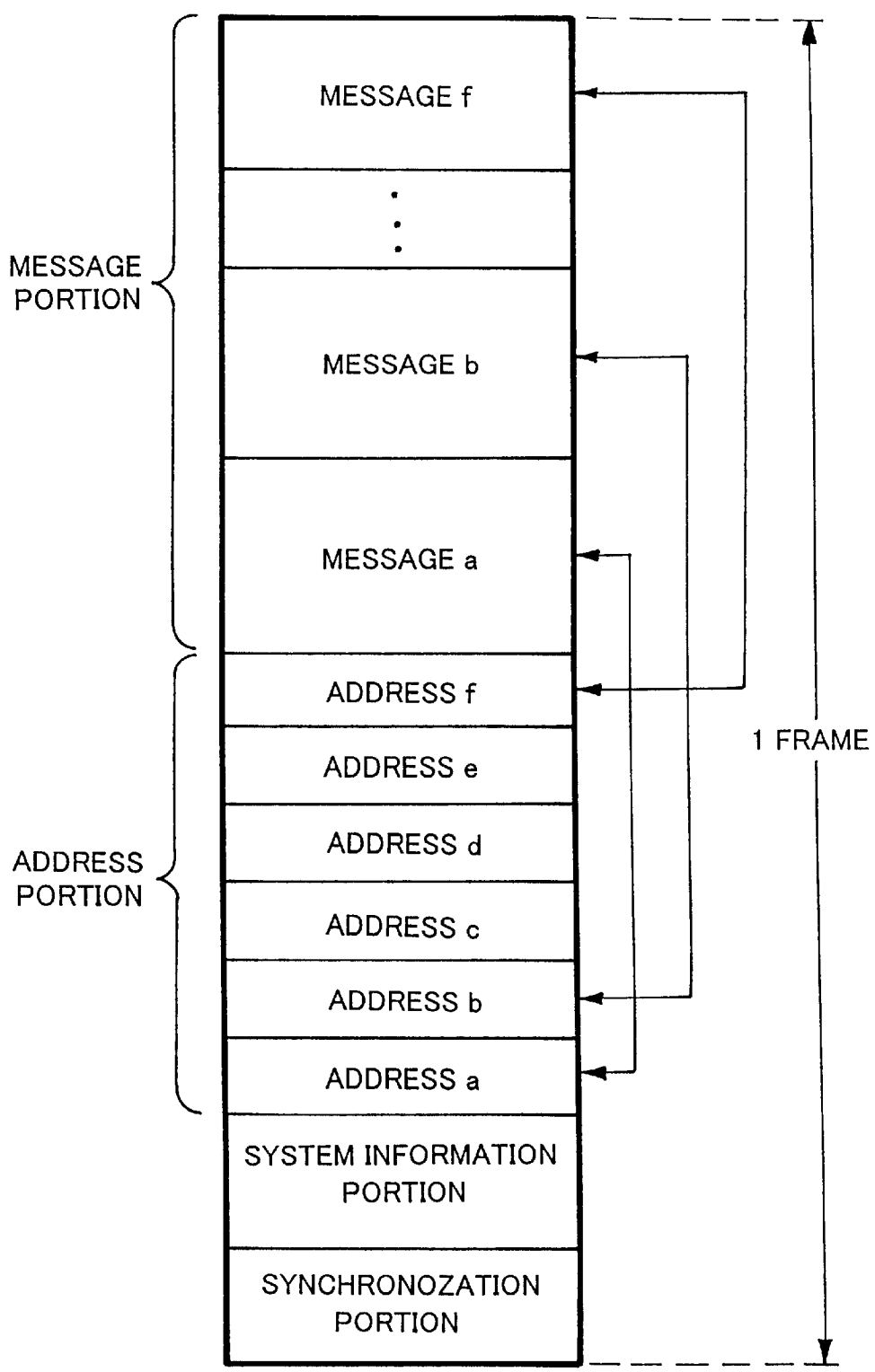
FIG. 1 is a diagram showing a format of one frame of a message.

FIG. 1 shows a format of a message. Referring to FIG. 1, one frame of the message is composed of a synchronization portion, system information, address portion, and message portion. The system information includes area code, country code, and transmission station code indicating a station which directly transmits the message. The address portion is divided into sub-portions and the message portion is also divided into sub-portions. Each sub-portion of the address portion corresponds to each sub-portion of the message portion. Each sub-portion of the address portion is an address of the corresponding sub-portion of the message portion. The address is an information message address or a personal message address. Each sub-portion of the message portion is composed of a message attribute and message data. The message attribute includes a flag indicating whether the source of the message is a transmission station which directly transmits the message to the receiver.

Figure 2:
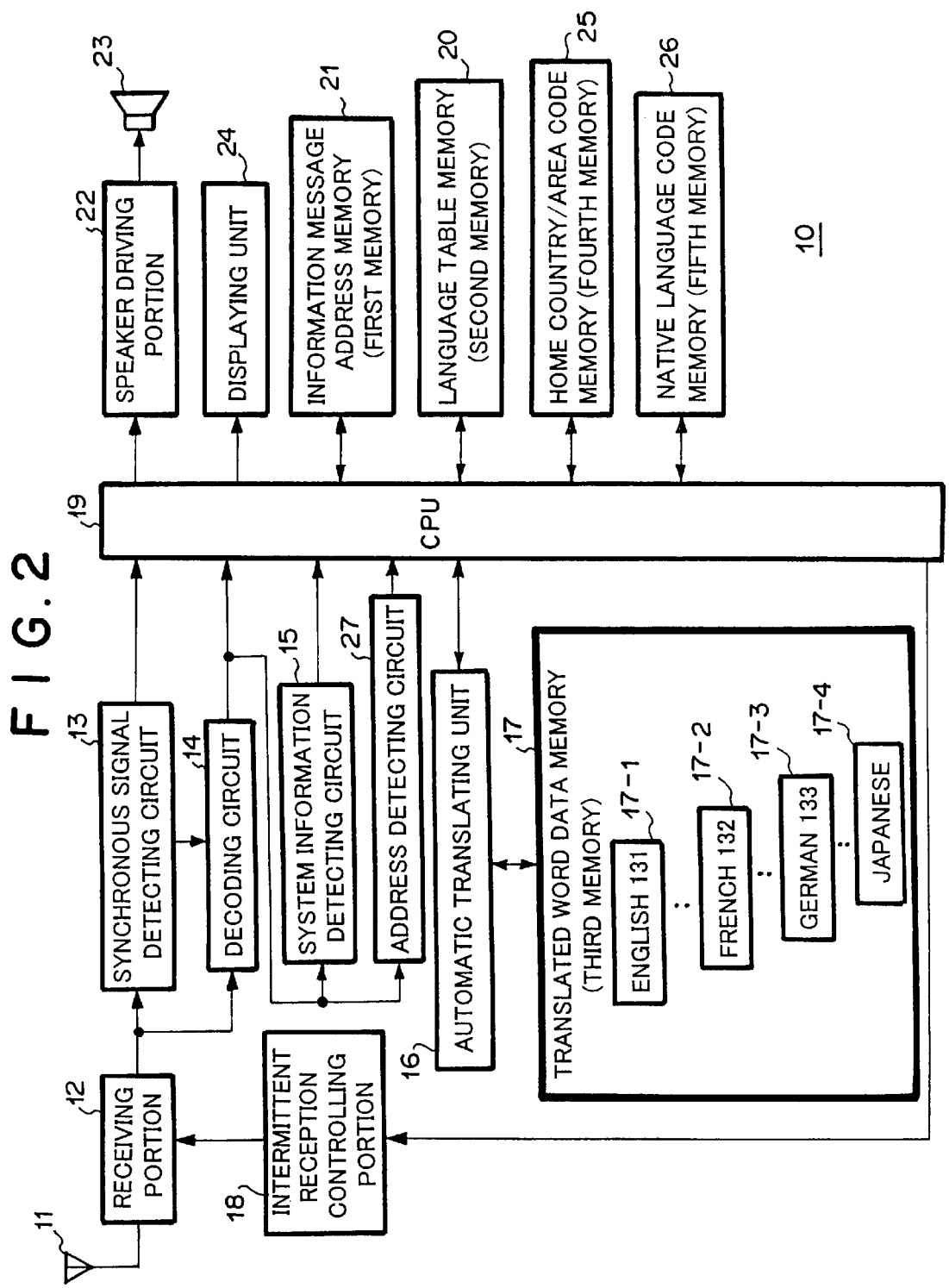
FIG. 2 is a block diagram showing an outlined structure of a radio selective calling receiver according to an embodiment of the present invention.
Figures 4, 5:
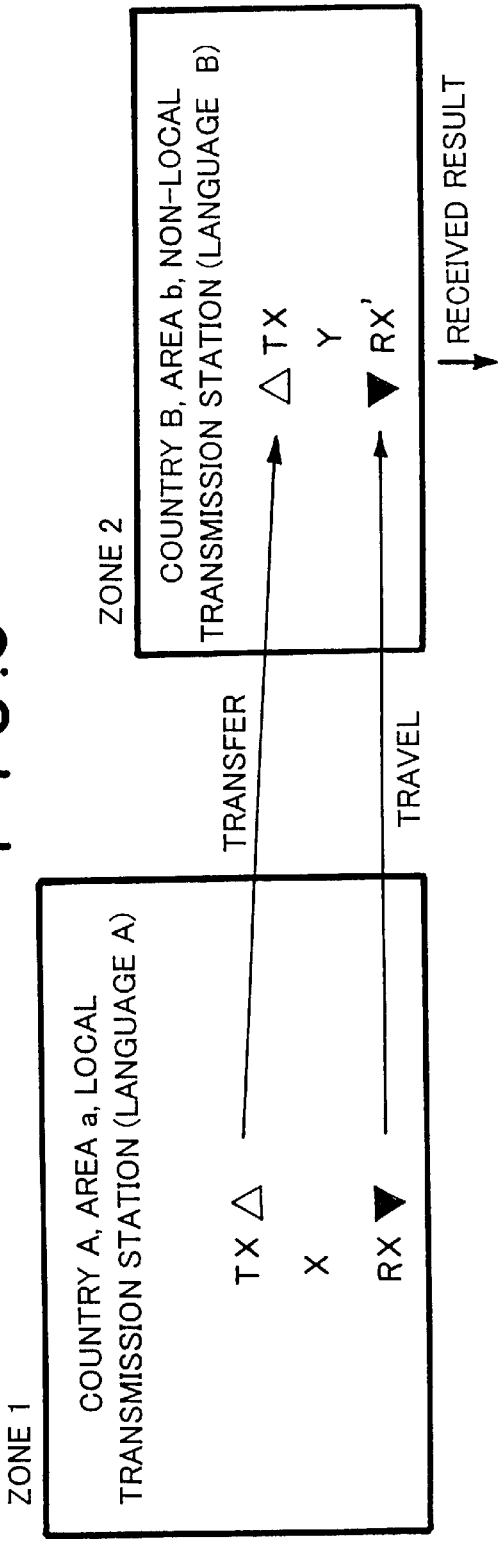
FIG. 4 is a schematic diagram showing an example of the structure of language table memory 20 shown in FIG. 2.
FIG. 5 is a schematic diagram for explaining usage of the radio selective calling receiver according to the embodiment of the present invention.

FIG. 2 is a block diagram showing the structure of principal portions of the radio selective calling receiver according to the present invention. Radio selective calling receiver 10 shown in FIG. 2 comprises antenna 11, receiving portion 12, synchronous signal detecting circuit 13, decoding circuit 14, system information detecting circuit 15, address detecting circuit 27, displaying unit 24, speaker driving portion 22, speaker 23, intermittent reception controlling portion 18, information message address memory (first memory) 21, language table memory (second memory) 20, translated word data memory (third memory) 17, home country/area code memory (fourth memory) 25, native language code memory (fifth memory) 26, CPU 19, and automatic translating unit 16. Receiving portion 12 receives a personal message and an information message from antenna 11 and performs a demodulating process for the personal message and the information message. The personal message is transmitted to the radio selective calling receiver from a local transmission station of the subscriber through a non-local transmission station which is connected to the local transmission station by contract and handles the same transmission protocol as the local transmission station. Synchronous signal detecting circuit 13 inputs the demodulated signal from receiving portion 12 and detects a synchronous signal of each frame thereof. Decoding circuit 14 decodes the demodulated signal that is output from receiving portion 12 in synchronism with the synchronous signal detected by synchronous signal detecting circuit 13 and outputs the decoded data to CPU 19, system information detecting circuit 15, and address detecting circuit 27. System information detecting circuit 15 detects a system information including area code, country code, and a transmission station code to supply detected area code, country code and transmission station code to CPU 19. The code of the receiver's home country and area has been set by a user and stored in home country/area code memory (fourth memory) 25. Address detecting circuit 27 detects address to supply it to CPU 19. Displaying unit 24 displays the received message. Speaker driving portion 22 drives speaker 23. Intermittent reception controlling portion 18 intermittently turns on/off a power supply to receiving portion 12 at predetermined reception intervals. Information message address memory (first memory) 21 stores addresses of information messages. Language table memory (second memory) 20 stores table which relates languages with pairs of country and area as shown in FIG. 4. Translated word data memory (third memory) 17 stores translated word data for plural languages. Translated word data memory 17 include, for example, English words set 17-1, French words set 17-2, German words set 17-3, and Japanese words set 17-4. Native language code memory 26 holds a code of a native language set by a user.

As explained above, a personal message is normally transmitted in a native language of a subscriber from a local transmission station through a non-local transmission station.

An information message is a public service message originated and transmitted from a non-local transmission station and as explained above, it is, for example, a weathercast information message, a traffic information message, or sightseeing guide information message.

Thus, an information message is transmitted in the language of the area of a non-local transmission station. Thus, when a subscriber of the local transmission station travels a foreign country or area and receives an information message in the country or area, he or she receives the information message in the language of the country or area. When an information message in the non-native language is received, the receiver translates the information message into the native language of the subscriber and the translated message is notified to the subscriber in characters and a voice.

In contrast, a personal message as a personal service message is transmitted in the language of a person who sends the personal message and the language is usually the native language because the sender uses the native language. Therefore, it is not necessary to translate the personal message in the native language and the personal message is directly notified to the subscriber.

Figure 3:
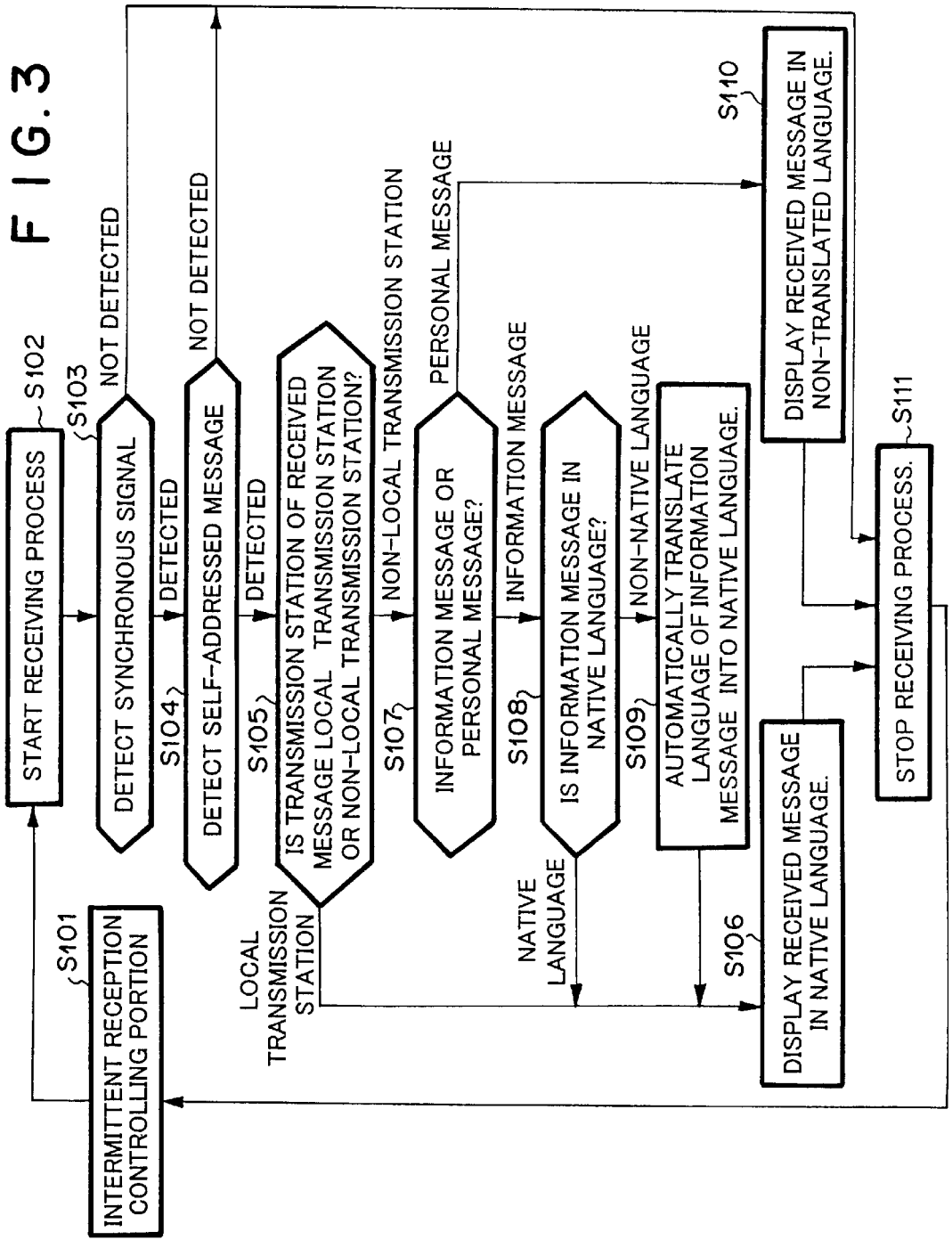
FIG. 3 is a flow chart showing a receiving operation of the radio selective calling receiver according to the embodiment of the present invention.

Next, with reference to FIG. 3 along with FIG. 2, the receiving process of the radio selecting calling receiver according to the present invention will be explained. FIG. 3 is a flow chart showing the receiving process.

Intermittent reception controlling portion 18 intermittently turns on/off the power supply of receiving portion 12 at predetermined reception intervals (at step S101 shown in FIG. 3). When receiving portion 12 receives a radio message from a transmission station through antenna 11, receiving portion 12 demodulates the radio message in a predetermined method and supplies the demodulated signal to synchronous signal detecting circuit 13 and decoding circuit 14 (at step S102).

Synchronous signal detecting circuit 13 detects a synchronous signal of each frame of the demodulated signal received from receiving portion 12 (at step S103) and supplies the synchronous signal to CPU 19 and demodulating circuit 14. When synchronous signal detecting circuit 13 cannot detect the synchronous signal (namely, the determined result at step S103 is No), the flow skips to step S111.

Decoding circuit 14 decodes the demodulated signal received from receiving portion 12 and supplies the decoded data to CPU 19, system information detecting circuit 15, and address detecting circuit 27. CPU 19 determines whether or not the received message as the decoded data received from decoding circuit 14 is a self-addressed message on the basis of address detected in address detecting circuit 27 by referring to the own address of the receiver and addresses of information messages in synchronism with the synchronous signal (at step S104).

If it is judged that the message is addressed to the receiver, the flow advances to step S105. On the other hand, if it is judged that the message is not addressed to the receiver, the flow skips to step S104.

System information detecting circuit 15 detects system information containing area code, country code, and transmission station code from the decoded data received from decoding circuit 14, extracts the area code, the country code and the transmission station code from the system information, and supplies the area code, the country code and the transmission station code to CPU 19.

CPU 19 compares the area code and country code stored in home country/area code memory (fourth memory) 25 with the area code and country code received from system information detecting circuit 15 and determines whether the transmission station which directly transmitted the message is the local transmission station or the non-local transmission station (at step S105). Alternatively, CPU 19 may compare the transmission station code stored in home country/area code memory (fourth memory) 25 in addition to the area code and country code with the transmission station code received from system information detecting circuit 15 and determines whether the transmission station which directly transmitted the message is the local transmission station or the non-local transmission station.

When CPU 19 has determined that the transmission station which directly transmitted the message is the local transmission station or a user of the receiver stays in his home area of his home country, CPU 19 causes displaying unit 24 and speaker 23 to output the subscriber addressed message in the non-translated language no matter whether the message is an information message or a personal message (at step S106).

When CPU 19 has determined that the transmission station which directly transmitted the message is the non-local transmission station or the user of the receiver travels outside of his home area/country, CPU 19 judges whether the message is an information message or a personal message by examining whether there is the same address as the address of the received message in information message address memory (first memory) 21 in which addresses of the information messages are stored (at step S107).

When CPU 19 has determined that the received message is a personal message, CPU 19 causes displaying unit 24 and speaker 23 to output the personal message in a non-translated language (at step S110).

When CPU 19 has determined that the received message is an information message, CPU 19 obtain a language code corresponding to the area code and country code detected by system information detection circuit 15 by referring to language table memory (second memory) 20 and compares the obtained language code with the native language code stored in native language code memory (at step S108). If CPU 19 has determined that the language corresponding to the area and country is the same as the native language, the process advances to step S106 where CPU 19 causes displaying unit 24 and speaker 23 to output the information message in a non-translated language, which is the same as the native language. On the other hand, if CPU 19 judges that the language corresponding to the area and country is not the same as the native language, the process advances to step S109 where CUP 19 causes automatic translating unit 16 to translate the information message from a language corresponding to the area and country to the native language by referring to translated word data memory (third memory) 17 and then the flow advances to step S106 where CPU 19 causes displaying unit 24 and speaker 23 to output the information message in a translated language, which is the same as the native language.

FIG. 4 is a table showing an example of the structure of language table memory 20. With reference to FIG. 4, a language is designated for a set of a country and an area instead of a mere country because a language which is used as a native language in a certain country is used as a native language in a certain area of another country.

With reference to FIG. 4, for example, English, French and Germany are registered.

Sets of a country and an area corresponding to English are a set of England and all areas, a set of USA and all areas, and a set of Canada and a English spoken area. Sets of a country and an area corresponding to French are a set of France and all areas, and a set of Canada and a French spoken area. A set of a country and an area corresponding to German is a set of Germany and all areas. There are English spoken area and French spoken area in Canada.

When a user (subscriber) whose native language is English receives a personal message from a non-local transmission station in an English spoken area in Canada, the personal message in the native language (or English) is output to displaying unit 24 and speaker 23.

When a user whose native language is English receives an information message from a non-local transmission station in an English spoken area in Canada, the information message in the native language (or English) is supplied to displaying unit 24 and speaker 23 because English is the native language of the user.

When a user whose native language is French receives an information message from a non-local transmission station in any area in the United States, the information message is supplied to automatic translating unit 16, automatic translating unit 16 translates the information message into French and the translated information message is output to displaying unit 24 and speaker 23 because English is not the native language of the user.

United Kingdom, USA, France, and German have one native language, respectively. However, some countries such as Canada have two or more native languages. In the latter case, a language should be selected corresponding to a pair of a country and an area rather than a country.

In case that a table memory holding correspondence between transmission stations and languages is provided and a language used in an information message is judged by referring to such a table, the receiver may cope with such a case that a transmission station transmits an information message in a language different from that used for an information message transmitted from another transmission station in the same area and country.

When lauguages, areas, and countries other than those shown in FIG. 4 are registered with language table memory 20, and words sets other than those shown in FIG. 2 are stored in translated word data memory (third memory) 17, the receiver can be used in countries other than those appeared in the explanation.

FIG. 5 is a schematic diagram showing example usage of the radio selective calling receiver according to the present invention.

Referring to FIG. 5, the country, area, and transmission station (TX) in zone 1 are different from those in zone 2. The transmission station in zone 1 is a local transmission station. The transmission station in zone 2 is a non-local transmission station. The local transmission station and the non-local transmission station are connected each other under a contraction. These transmission stations can accommodate subscribers of both transmission stations and exchange messages therebetween.

The radio selective calling receiver (RX) which stays in zone 1 displays and speaks both of an information message and a personal message in a native language.

In case that the language used in zone 1 is the same as that used in zone 2, the receiver (RX') which travels zone 2 displays and speaks an information message in the language of zone 1 without translation, a personal message originated from zone 1 in the language of zone 1 without translation, and a personal message originated from zone 2 in the language of zone 1 without translation.

In case that the language used in zone 1 is different from that used in zone 2, the receiver (RX') which travels zone 2 displays and speaks an information message in the language of zone 1 after translation, a personal message originated from zone 1 in the language of zone 1 without translation, and a personal message originated from zone 2 in the language of zone 2 without translation.

As explained above, according to the present invention, a multilingual function is available in any country/area where different languages are used.

In addition, since an information message is automatically translated into the native language of a user in a foreign country or an area in which a non-native language for the user is used, a valuable information message can be obtained in the native language on real time basis.

Further, corresponding to the type of a received message, it can be determined whether or not to automatically translate the received message. Thus, a subscriber addressed message transmitted from the local transmission station through the non-local transmission station can be prevented from being improperly translated.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A message receiving method, which comprises:
    a first step of judging whether a received message is originated from a local transmission station or a non-local transmission station;
    a second step of judging whether the received message is an information message or a personal message when the received message is judged to be originated from the non-local transmission station;
    a third step of judging whether or not a native language is used in the received message when the received message is judged to be the information message; and
    a fourth step of translating the received message into a native language when it is judged that the native language is not used in the received message.

2. The method as set forth in claim 1, wherein the received message is not translated into the native language when the received message is originated from the local transmission station.

3. The method as set forth in claim 1, wherein the received message is not translated into the native language when the received message is judged to be the personal message.

4. The method as set forth in claim 1, wherein the received message is not translated into the native language when it is judged that the native language is used in the received message.

5. The method as set forth in claim 1, wherein the first step is executed by comparing an area code and country code in the received message with an area code and country code held by the receiver.

6. The method as set forth in claim 1, wherein the first step is executed by comparing a transmission station code in the received message with a transmission station code held by the receiver.

7. The method as set forth in claim 1, wherein the second step is executed by examining whether an address of the received message is allocated to the information message.

8. The method as set forth in claim 7, wherein the examination is carried out by referring to a memory which stores addresses allocated to the information messages.

9. The method as set forth in claim 1, wherein the third step comprises steps of:
    extracting a pair of country code and an area code from the received message;
    retrieving a language code corresponding to the pair of the country code and the area from a memory which stores correspondence between pairs of a country code and a area code and language codes; and
    comparing the retrieved language code with a native language code held in the receiver.

10. The method as set forth in claim 1, wherein the third step comprises steps of:
    extracting a transmission station code from the received message; and
    comparing the extracted transmission station code with a transmission station code held in the receiver.

11. A radio selective calling receiver for receiving a message, which comprises:
    means for judging whether a received message is originated from a local transmission station or a non-local transmission station;
    means for judging whether the received message is an information message or a personal message when the received message is judged to be originated from the non-local transmission station;
    means for judging whether or not a native language is used in the received message when the received message is judged to be the information message; and
    means for translating the received message into a native language when it is judged that the native language is not used in the received message.

12. The receiver as set forth in claim 11, which further comprises means for comparing an area code and country code in the received message with an area code and country code held by the receiver.

13. The receiver as set forth in claim 11, which further comprises means for comparing a transmission station code in the received message with a transmission station code held by the receiver.

14. The receiver as set forth in claim 11, which further comprises means for examining whether an address of the received message is allocated to the information message.

15. The receiver as set forth in claim 14, which further comprises means for referring to a memory which stores addresses allocated to the information messages.

16. The receiver as set forth in claim 11, which further comprises:
    means for extracting a pair of country code and an area code from the received message;
    means for retrieving a language code corresponding to the pair of the country code and the area from a memory which stores correspondence between pairs of a country code and a area code and language codes; and
    means for comparing the retrieved language code with a native language code held in the receiver.

17. The receiver as set forth in claim 11, which further comprises:
    means for extracting a transmission station code from the received message; and
    means for comparing the extracted transmission station code with a transmission station code held in the receiver.

18. A radio selective calling receiver for receiving a message, which comprises:
    an antenna for receiving an encoded message;

a synchronous signal detecting circuit for detecting a synchronous signal from the encoded message;

a decoding circuit for decoding the encoded message into a message;

a system information detecting circuit for detecting system information in the message;

an address detecting circuit for detecting address in the message;

a translating unit for executing translation of the message;

a translated word data memory for storing translated data sets used for the translation;

a home country/area code memory for storing a home country and home area of the receiver;

a native language code memory for storing a native language code;

an information message address memory for storing addresses of information messages;.

a language table memory for storing correspondence between languages and pairs of a country code and an area code; and controlling means for executing following steps:

a first step of judging whether the received message is originated from a local transmission station or a non-local transmission station;

a second step of judging whether the received message is an information message or a personal message when the received message is judged to be originated from the non-local transmission station;

a third step of judging whether or not a native language is used in the received message when the received message is judged to be the information message; and a fourth step of causing said translating unit to translate the received message into a native language when it is judged that the native language is not used in the received message.

19. A radio selective calling receiver for receiving a message, which comprises:

an antenna for receiving an encoded message;

a synchronous signal detecting circuit for detecting a synchronous signal from the encoded message;

a decoding circuit for decoding the encoded message into a message;

a system information detecting circuit for detecting system information in the message;

an address detecting circuit for detecting address in the message;

a translating unit for executing translation of the message;

a translated word data memory for storing translated data sets used for the translation;

a home transmission station code memory for storing a home transmission station code of the receiver;

a native language code memory for storing a native language code;

an information message address memory for storing addresses of information messages;

a language table memory for storing correspondence between languages and transmission station codes; and controlling means for executing following steps:

a first step of judging whether the received message is originated from a local transmission station or a non-local transmission station;

a second step of judging whether the received message is an information message or a personal message when the received message is judged to be originated from the non-local transmission station;

a third step of judging whether or not a native language is used in the received message when the received message is judged to be the information message; and a fourth step of causing said translating unit to translate the received message into a native language when it is judged that the native language is not used in the received message.

* * * * *